United States Patent [19]

Knibbe et al.

[11] 3,957,112
[45] May 18, 1976

[54] OFFSHORE APPARATUS FOR CARRYING OUT OPERATIONS IN AN OFFSHORE WELL

[75] Inventors: David E. Knibbe, Delft, Netherlands; David C. S. Pitham, Pakuranga, Auckland, New Zealand

[73] Assignee: Shell Oil Company, Houston, Tex.

[22] Filed: Nov. 14, 1974

[21] Appl. No.: 523,640

[30] Foreign Application Priority Data
Nov. 20, 1973 United Kingdom............... 53724/73

[52] U.S. Cl........................................ 166/.5; 9/8 R
[51] Int. Cl.²........................................ E21C 19/00
[58] Field of Search ............... 166/.5; 175/7; 9/8 R, 9/8 P; 138/111

[56] References Cited
UNITED STATES PATENTS

| | | |
|---|---|---|
| 3,090,976 | 5/1963 | Liu........................................... 9/8 R |
| 3,117,596 | 11/1964 | Kahn................................. 138/111 X |
| 3,178,736 | 4/1965 | Gross........................................ 9/8 R |
| 3,272,910 | 9/1966 | Flint.................................... 9/8 R X |
| 3,354,951 | 11/1967 | Savage et al............................ 166/.6 |
| 3,729,756 | 5/1973 | Cook et al. ........................ 166/.5 X |
| 3,803,651 | 4/1974 | Moore....................................... 9/8 R |
| 3,835,890 | 9/1974 | Miceli................................. 9/8 R X |

FOREIGN PATENTS OR APPLICATIONS 579,801   8/1946   United Kingdom.................... 9/8 R

*Primary Examiner*—Ernest R. Purser
*Assistant Examiner*—Richard E. Favreau

[57] ABSTRACT

A marine riser or conductor that extends between a floating drilling vessel and an underwater wellhead is provided with buoyancy means in the form of small-diameter, stiff-walled fluidtight tubes arranged around the outer wall of the marine riser.

15 Claims, 11 Drawing Figures

OFFSHORE APPARATUS FOR CARRYING OUT OPERATIONS IN AN OFFSHORE WELL

BACKGROUND OF THE INVENTION

The present invention relates to an offshore apparatus for carrying out operations in an offshore well. Such apparatus comprises underwater well equipment, a floating platform and a marine riser extending upwards from the underwater well equipment towards the platform.

The marine riser or conductor is used as a means for entering the well with equipment for carrying out operations in the well, such as for carrying out drilling operations or work-over operations. Also, when carrying out drilling operations through the riser, the riser is used as a return path for drilling liquid. The riser may extend between the platform and an underwater wellhead positioned near the bottom of the body of water. In an alternative arrangement, the riser extends between a conductor casing cemented in the sea bottom (or ocean bottom) and an underwater wellhead that is positioned below the water level at a distance that is relatively small with respect to the depth of the body of water at the location where the submerged well is situated. Both arrangements are known. In the first arrangement, the marine riser is removed after completion of the well. In the second arrangement, the marine riser is not removed after ending the drilling operations, but remains as an integral part of the well after completion thereof. An advantage of the underwater wellhead arranged on the upper end of the upstanding marine riser is that the wellhead is at a shallow depth below the water level and can easily be visited by divers for control or repair of the wellhead.

In particular when carrying out operations in submerged wells situated in seas of great depths or in oceans, the weight of the marine riser that has to be supported by the floating platform or by a separate float is extremely large. To reduce this weight, it has already been proposed to mount buoyancy means on the sections of the marine riser.

Each such section consists of a large-diameter open-ended metal tube with coupling means at both ends thereof for coupling the tube to similar tubes of other sections. The buoyancy means may consist of metal containers filled with gas, or of foam plastic bodies of semi-cylindrical shape that are clamped around the tube. The foam plastic bodies may contain gas-filled plastic spheres.

SUMMARY OF THE INVENTION

The object of the invention is an offshore apparatus for carrying out operations in submerged wells, which apparatus comprises marine riser sections comprising buoyancy means that have a low effective density, are of simple construction and are relatively low in price.

A further object of the invention is an offshore apparatus for carrying out operations in submerged wells, which apparatus comprises marine riser sections comprising buoyancy means of which the separate buoyancy members can be replaced easily when they have been damaged or show leaks.

According to the invention, an offshore apparatus for carrying out operations in a submerged well comprises underwater well equipment, a floating platform and a marine riser, said riser extending upwards from the well equipment in the direction of the platform and consisting of sections interconnected by coupling means, each section comprising a large-diameter open-ended tube and small-diameter stiff-walled fluid-tight buoyancy tubes of circular cross-section arranged around the outer wall of the large-diameter tube in a manner such that the outer wall parts of the buoyancy tubes are loaded by a pressure substantially equal to the hydrostatic pressure at the level of these parts, and the buoyancy force of the buoyancy tubes is transmitted to the large-diameter tube.

A marine riser section according to the invention comprises a large-diameter open-ended tube with coupling means at both ends thereof for connecting the tube to similar tubes to form a marine riser adapted for being coupled to underwater well equipment, and small-diameter stiff-walled fluid-tight buoyancy tubes of circular cross-section arranged around the large-diameter tube in a manner such that buoyancy forces exerted by the buoyancy tubes in a direction along the large-diameter tube are transmitted to this large-diameter tube.

The present invention allows the use of a number of buoyancy tubes per riser section. Since the buoyancy tubes are of relatively small diameter and can be manufactured at low costs, the buoyancy means according to the invention is of simple and cheap construction compared with other known riser sections with buoyancy means, such as the riser section provided with a gas-filled double wall for reducing the underwater weight of the section. The outer wall of such a double-walled riser section has to be made of a material lighter than steel, in order to reach a sufficiently low weight of the riser. The use of various materials in the riser construction gives rise to expansion problems between the inner wall and the outer wall when the riser is lowered from the vessel into the relatively cold water, and consequently, such double-walled riser sections will readily be liable to leak, resulting in destruction of the buoyancy thereof.

Although hollow spherical bodies when used as buoyancy means will — as compared to hollow cylindrical bodies — for some materials show a better ratio between the weight of the body and the volume of the body, the more dense packing of cylindrical bodies with respect to spherical bodies will — for a given space available to store the bodies — result in a lower effective density for buoyancy means consisting of hollow cylindrical bodies. Under effective density of an assembly of hollow bodies, there is to be understood the weight of the bodies together with the weight of water in the interspace of the bodies, divided by the weight of the volume of water displaced by the bodies, together with the weight of the water in the interspace of the bodies.

BRIEF DESCRIPTION OF THE DRAWING

The invention will further be explained by way of example with reference to some embodiments that are shown in the drawings.

DESCRIPTION OF A PREFERRED EMBODIMENT

Figure 1:
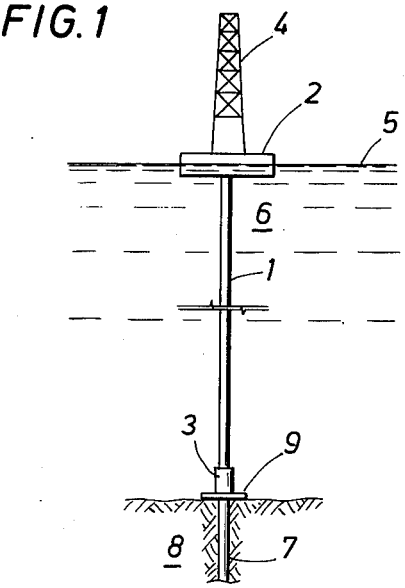
FIG. 1 shows a marine riser according to the invention, which riser extends between a floating drilling vessel and an underwater wellhead.

The marine riser 1 shown in FIG. 1 of the drawing extends between the floating platform 2 and the submerged wellhead 3. The platform 2 carries drilling equipment such as the derrick 4 and floats on the surface 5 of the body of water 6. The wellhead 3 is mounted on the conductor casing 7 cemented in the sea bottom 8. The reference numeral 9 indicates a base plate supporting the conductor casing 7.

As will be explained hereinafter in more detail, the marine riser 1 consists of a large number of riser sections, each section comprising a large-diameter tube open at both ends, and buoyancy members in the form of small-diameter stiff-walled fluid-tight tubes. It will be appreciated that the expressions "large" and "small" are not absolute but are applied to indicate that the diameter of the buoyancy tubes is essentially not larger than the diameter of the marine riser tube.

Figure 2:
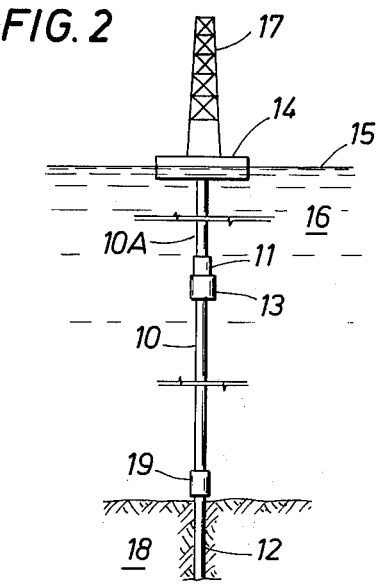
FIG. 2 shows a marine riser according to the invention, which riser extends between a conductor casing cemented in the sea bottom and a wellhead submerged at shallow depth below sea level.

The marine riser 10 used in the offshore apparatus according to the invention shown in FIG. 2 of the drawing extends between the submerged wellhead 11 and the conductor casing 12. The wellhead 11 is supported by a float 13 well above the sea bottom 18 and communicates via an auxiliary marine riser 10 A with the vessel 14 floating on the surface 15 of the body of water 16. The vessel 14 carries drilling equipment, such as a derrick 17. The conductor casing 12 is cemented in the sea bottom 18. Reference numeral 19 denotes a coupling for coupling the lower end of the riser 10 to the upper end of conductor casing 12.

It will be appreciated that the auxiliary marine riser 10 A (see FIG. 2) may consist of riser sections that are of the same design as the sections of the riser 10. When the length of the auxiliary riser 10 A is limited, the sections of the riser 10 A may be of a design without buoyancy means.

The marine risers 1 and 10 are used for guiding equipment (such as a drill string) into the submerged wells 7 and 12, respectively, in which wells operations are to be carried out. When liquid should be circulated through the well (such as in drilling operations), the annular space between the marine riser and a pipe string lowered from the floating platforms 2 and 14, respectively, is used as a return path for such liquid that is injected into the well via the interior of the pipe string.

Various examples of marine riser sections and buoyancy means according to the invention that may be used in offshore apparatuses of the type shown in FIGS. 1 and 2 of the drawing will now be described in detail with reference to FIGS. 3–11 of the drawing.

Figure 3:
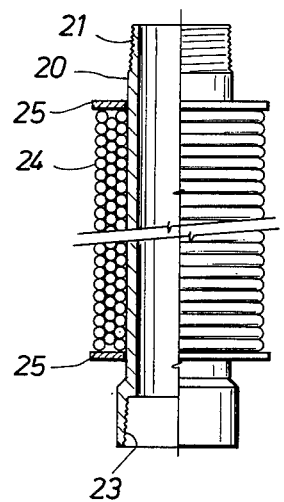
FIG. 3 shows a marine riser section according to the invention, partly in side view or front elevation and partly in longitudinal section, the marine riser section comprising buoyancy means consisting of torus-shaped tubes.

FIG. 3 shows partly in side view and partly in longitudinal section, a marine riser section having buoyancy means consisting of a number of small-diameter tubes in the form of tori. The section consists of a large-diameter metal tube 20 that is open at both ends thereof. The upper end of the tube 20 is provided with a conical pin screw thread 21. The lower end of the tube 20 is provided with a conical box screw thread 23. The screw threads are used for coupling the tube 20 to other tubes (not shown) of similar construction to form a marine riser. The buoyancy means of the marine riser section shown in FIG. 3 consist of a large number of small-diameter stiff-walled fluid-tight tubes 24, each bent in the form of a torus and filled with gas. The tori have different diameters such that a dense packing of the tori around the metal tube 20 can be effected. The tori are stapled between the flanges 25 mounted on the outside of the tube 20, preferably near the ends thereof, in a manner such that the sea water can contact the tori at all sides thereof when the riser section is submerged in the sea. Then the load exerted by the hydrostatic pressure on the tubes 24 is uniformly distributed, and since the cross-section of the tubes 24 is circular, a favorable load distribution over the wall of each tube 24 is obtained. The buoyancy forces of the tubes 24 are transmitted to the tube 20 via the upper flange 25 when the marine riser section is submerged in the position shown in FIG. 3.

Figure 4:
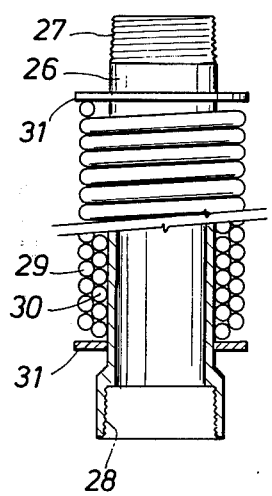
FIG. 4 shows a marine riser section according to the invention, partly is side view or front elevation and partly in longitudinal section, wherein the buoyancy means consist of small-diameter tubes wound in the form of a screw line around the large-diameter tube of the riser section.

FIG. 4 shows partly in side view and partly in longitudinal section, a marine riser section having buoyancy means consisting of tubes wound in the form of screw lines. The section consists of a large-diameter metal tube 26 that is open at both ends thereof. The upper end of the tube 26 is provided with a conical pin screw thread 27. The lower end of the tube is provided with a conical box screw thread 28. The screw threads are used for coupling the tube to other tubes of similar construction to form a marine riser. The buoyancy means shown in FIG. 4 consist of two small-diameter still-walled fluid-tight tubes 29 and 30 wound around the large-diameter tube 26 along two screw lines of different diameter. The tubes 29 and 30 are arranged between the buoyancy transmitting means in the form of flanges 31 mounted on the outside of the tube 26. There is sufficient space available between the windings of each tube 29, 30, as well as between the two tubes 29 and 30, and between the inner tube 30 and the outer wall of the tube 26 to allow the water to contact the outer walls of the tubes 29, 30 when the riser section is submerged. At least one of the flanges 31 may be removably mounted on the tube 26. The buoyancy force of the tubes 29 and 30 is transmitted to the tube 26 via the upper flange 31 when the riser section is submerged in the vertical position shown in FIG. 4.

Figure 5:
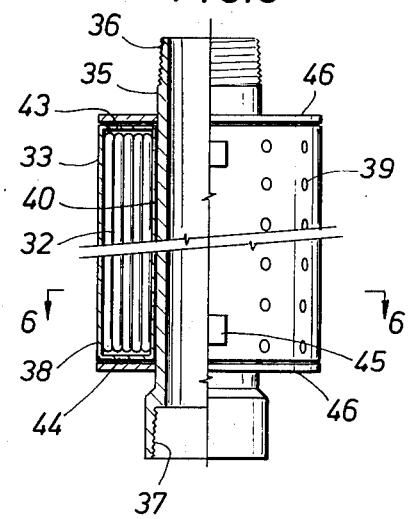
FIG. 5 shows a marine riser section according to the invention, partly in side view or front elevation and partly in longitudinal section, wherein the buoyancy means consist of small-diameter tubes sealed at both ends and extending substantially parallel to the large-diameter tube of the riser section.
Figure 10:
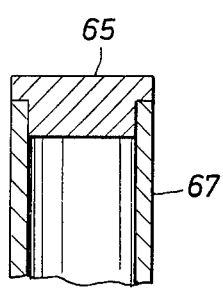
FIG. 10 shows in detail a closing member for sealing of the ends of a small-diameter tube.
Figure 11:
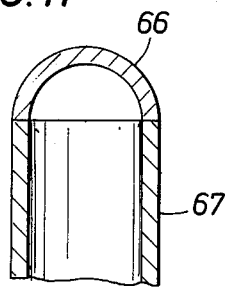
FIG. 11 shows an alternative of the closing member shown in FIG. 10.
Figure 6:
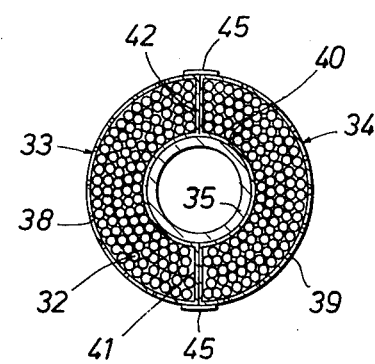
FIG. 6 shows a cross-section over the marine riser section shown in FIG. 5 taken in the direction of arrows 6—6.

It will be appreciated that an envelope in the form of a cylindrical wall, similar to those shown with regard to FIGS. 5 and 6, for protecting the buoyancy tubes may be arranged around the buoyancy tubes of the riser sections shown in FIGS. 3 and 4. In the riser section shown in FIG. 3, this protective cover (not shown) may be connected to the flanges 25, which flanges then form part of the envelope. Either this cover and/or one of the flanges 25 is perforated to allow the water to contact the tubular means 24 when the riser section is submerged. In a similar manner, such protective cylindrical cover may be arranged between the flanges 31 of the riser section shown in FIG. 4. Any material may be chosen for this cover provided that it is sufficiently strong to protect the buoyancy tubes, is not attacked by water, and has a sufficiently low density.

By mounting the protective cover in a disconnectible manner on the flanges 25, the cover can be removed easily to replace (after removal of one of the flanges) tubular buoyancy means that have been damaged or prove to be leaking.

FIG. 5 shows partly in side view and partly in longitudinal section, a marine riser having buoyancy means in the form of substantially straight small-diameter stiff-walled fluid-tight tubes 32. These tubes are held together by two envelopes 33, 34 (see FIG. 6), each envelope having an interior with semi-annular cross-section. The envelopes are arranged around the metal tube 35 that is provided with couplings 36 and 37 at the ends thereof to couple the marine riser section shown in FIG. 5 with similar sections (not shown) to form a marine riser. The envelopes 33 and 34 each comprise a semi-cylindrical wall 38 provided with perforations 39, and a semi-cylindrical wall 40 of smaller radius than the wall 38, these walls being interconnected by walls 41 and 42 of rectangular shape and by end walls 43 and 44 of semi-annular shape. The envelopes 33 and 34 are interconnected by strips 45 welded to the outer walls 38 of the envelopes. A displacement of the envelopes 33 and 34 along the tube 35 is prevented by the flanges 46 connected to the outer surface of the tube 35. At least one of the flanges may be removably connected to this tube 35.

It will be appreciated that the perforations 39 may be arranged in the walls 43 and 44 instead of in the wall 38. Further, perforations may be arranged in the flanges 46 in a manner so as to communicate with the perforations arranged in the walls 43 and 44.

The buoyancy means of the marine riser section shown in FIGS. 5 and 6 consist of a number of substantially straight small-diameter stiff-walled fluid-tight tubes 32 that are held together by the envelopes 33 and 34 in a manner such that in the submerged position of the marine riser, the outer surfaces of the tubes 32 are loaded by the hydrostatic pressure prevailing at the level of the tubes. Thus, the load exerted by the hydraulic pressure on each of the tubes 32 is uniformly distributed over a cylindrical surface which results in a favorable load distribution over the wall of each tube 32.

The buoyancy force of the tubes 32 is transmitted by the upper wall 43 of each envelope 33, 34 to the tube 35 via the upper flange 46 when the marine riser section is submerged in the position shown in FIG. 5.

By mounting at least one of the end walls 43, 44 in a disconnectible manner to the other walls of the enclosure 33, those buoyancy tubes 32 that are leaking or are damaged can be easily replaced after removal of the strips 45. Also, the wall 43 of the enclosure may be omitted. The buoyancy forces of the tubes 32 will then be transmitted directly to the upper flange 46 when the marine riser section is submerged in vertical position.

The tubes acting as buoyancy means need not all be of the same diameter as in the embodiments shown in FIGS. 3, 4, 5, and 6. Tubes of different diameter may be used, and three possible patterns of arranging small-diameter straight tubes to form elongate buoyancy means with curved cross-section are shown in FIGS. 7, 8 and 9, respectively.

Figure 7:
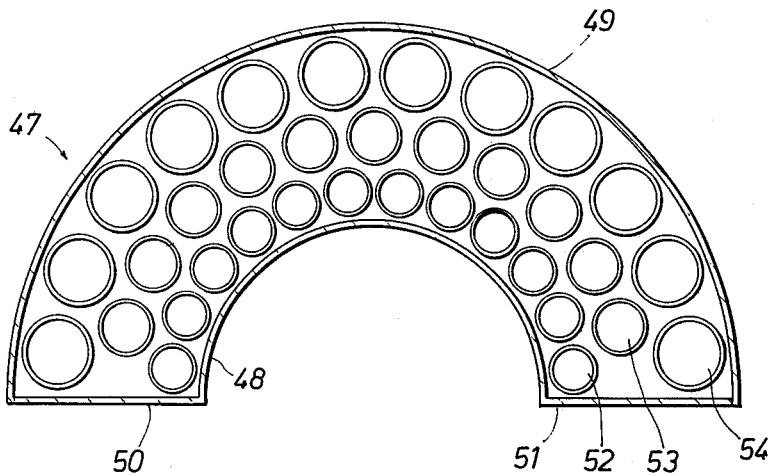
FIG. 7 shows a cross-section over a buoyancy means for use in a marine riser section according to the invention, this buoyancy means comprising tubes of various diameter.

FIG. 7 shows a cross-section over a buoyancy means comprising an elongate enclosure 47, consisting of two semi-circular walls 48 and 49, two rectangular walls 50 and 51, and (not shown) two semi-annular walls at the ends of the enclosure. The buoyancy means comprises three rows of tubes. The first row consists of 12 tubes 52 of the same diameter and is arranged around the semi-circular wall 48. The next row of tubes 53 is arranged around the first row of tubes 52. The diameter of the tubes 53 is larger than the diameter of the tubes 52. The tubes 54 of the third row of tubes have a diameter larger than the diameter of the tubes 53. The third row of tubes 54 is arranged between the second row of tubes 53 and the semi-circular wall 49. The packing ratio of these three rows of tubes is about 83%. When applying resin tubes reinforced with glass fibers and adapted for withstanding pressures up to 100 atmospheres, the effective density of the buoyancy member shown in FIG. 7 is about 0.46. The inner radius of the envelope 47 is about 25 centimeters and outer radius thereof is about 50 centimeters. When coupling two buoyancy members of the type shown in FIG. 7 to a steel marine riser section having a wall thickness of 1.2 centimeter and an outer diameter of 47 centimeters, the effective density of the assembly will be about one. This is on the assumption that the enclosure 47 is perforated (not shown) and the space inside the enclosure but outside the tubes 52–54 is filled with water when the assembly is submerged. In an alternative construction, the space outside the tubes 52–54 may be filled with a composition adapted for transmitting hydraulic pressure. In this case, the enclosure is not perforated but provided with means for transmitting hydraulic pressure from the outside thererof to the inside thereof. These means may consist of one or more membranes arranged in one of the walls of the envelope or of other pressure-transmitting equipment suitable for the purpose. By choosing a composition having a density lower than one, the dimensions of the buoyancy means can be reduced.

The composition used to fill up the space between the tubes 52–54 may be of any type suitable for the purpose. It must, inter alia, be resistant to high pressures and low temperatures, may not deteriorate with time, and must be low in price. The composition may be of liquid or grease-like consistency. Examples of such composition are hydrocarbon oils and grease.

Figure 8:
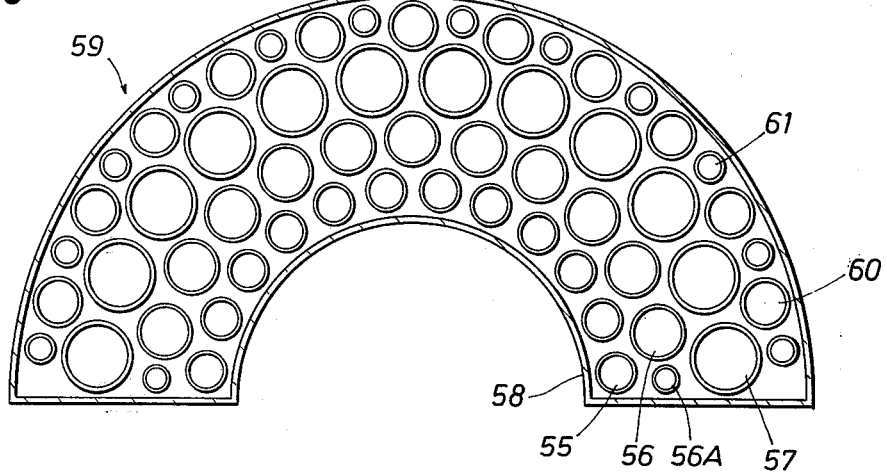
FIG. 8 shows an alternative of the buoyancy means of FIG. 7.
Figure 9:
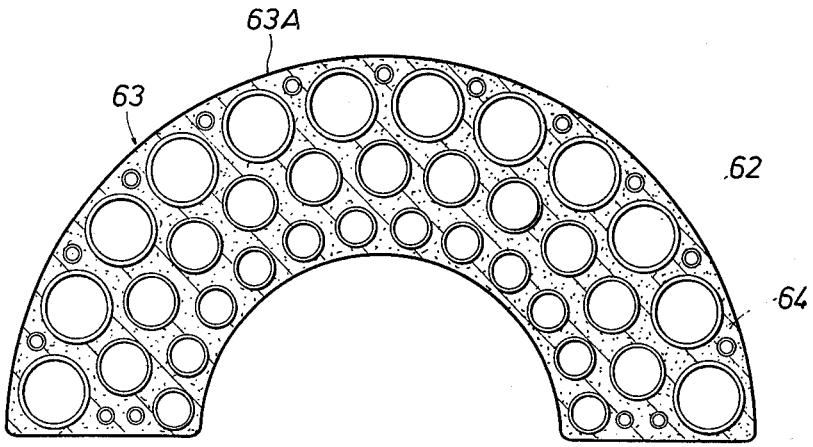
FIG. 9 shows another alternative of the buoyancy means of FIG. 7.

An alternative pattern for packing the small-diameter tubes acting as a buoyancy means is shown in FIG. 8. Instead of three rows of tubes as shown in FIG. 7, the buoyancy means of FIG. 8 comprises four rows of tubes. As in FIG. 7, the first three rows 55, 56 and 57 nearest to the inner wall 58 of the envelope 59 have tubes of the same diameter per row, the diameters of tubes belonging to adjoining rows differing from each other. The fourth row, however, comprises tubes 60 and 61 of two different diameters. The packing ratio of these four rows is about 85%. The free spaces at the ends of the row of tubes 56 have been filled up by tubes 56 A of a diameter smaller than the diameter of tubes 56.

It will be appreciated that all observations made in connection with the embodiment shown in FIG. 7 regarding the use of a composition in the space between the tubes, which composition is adapted for transmitting hydraulic pressure, also apply to the embodiment shown in FIG. 8. These observations further apply to the embodiment shown in FIGS. 5 and 6, as well as to any other buoyancy means or marine riser section with buoyancy means according to the present invention, wherein the samll-diameter tubes are held together by means of an envelope.

Still another embodiment of the invention is shown by way of example in FIG. 9 of the drawing. In this embodiment, a plurality of substantially straight tubes 62 is assembled to an elongate body 63 with curved cross-section (this cross-section being shown in FIG. 9) by means of a composition 64, which adheres to the outer walls of the tubes 62 and is adapted for transmitting hydraulic pressure acting on the outside of the body 63 to the outer surfaces of the tubes 62 such that these tubes are loaded by a pressure substantially equal to the hydrostatic pressure prevailing at the level of the tubes 62 when the body 63 is submerged. Various compositions, such as soft rubber compounds may be used for this purpose.

The outer wall of the body 63 may be covered by a layer (not shown) to protect the composition 64. This layer has to be sufficiently thin and flexible to allow the transmission of the pressure outside the body 63 to the composition 64. The composition need not necessarily surround the total outer area of those tubes 62 that are located in the outer row of tubes. Provided that the adherence between the surface of the tubes 62 and the composition is sufficiently strong, the tubes 62 of the outer row may only be partly embedded in the composition.

In another embodiment of the invention the composition 64 in the arrangement shown in FIG. 9 consists of an open-celled elastic foam that adheres to the outer walls of the tubes 62. The buoyancy means may be covered by a fluid-tight flexible layer, and the pore space of the foam may be filled with liquid, such as a liquid having a density lower than one.

The buoyancy means according to FIG. 9 may be connected to a marine riser section in any manner suitable for the purpose. The buoyancy means may be clamped around the riser section or glued thereto. Also, the buoyancy means may be assembled with the marine riser during manufacture of the buoyancy means by using a composition that adheres to the outer wall of the marine riser section.

The ends of the buoyancy tubes according to the invention may be sealed in any suitable manner. Closure caps 65 and 66 shown in FIGS. 10 and 11, respectively, may be used for this purpose. Cap 66 is glued or welded to the end of the tube 67, whereas cap 65 may be glued or welded to the end of tube 67 or simply be introduced in the end of this tube like a cork in a bottle. If desired, extra sealing means (not shown), such as O-rings, may be applied between the cap 65 and the tube 67.

It will be appreciated that the application of envelopes with semi-annular cross-section is particularly attractive when applying such envelopes in combination with marine riser tubes having a kill conduit and a choke conduit connected thereto. These conduits (not shown) in FIG. 6 run parallel to the tube 35 and are then accommodated between the walls 41, 42 of the envelopes. If desired, these walls 41, 42 may be provided with channel-shaped depressions to accommodate part of the conduit adjoining the walls.

If marine risers with four choke and kill conduits are to be provided with buoyancy means according to the invention, envelopes having a cross-section in the form of a quarter segment are to be used. Each envelope is then placed between a pair of adjoining conduits.

If the kill and choke lines are not present, cylindrical envelopes with annular cross-section may be used instead of the envelopes shown in FIGS. 5–8. A cylindrical envelope can be slipped over the large-diameter tube whereafter it is locked in longitudinal sense on this tube by mounting flanges of the type shown in FIG. 5 on this tube.

One advantage of the present invention resides in the use of buoyancy means comprising tubes having a relatively small diameter. Such tubes are easier and consequently cheaper to manufacture than large-diameter tubes. A further advantage is that when applying a large number of tubes, leakage of some of the tubes will hardly influence the buoyancy of the tubular buoyancy means as such. Also, the separate tubes may be easily replaced (such as in case of leakage thereof) when enclosed in an envelope since the tubes are not interconnected but relatively loosely packed around the large-diameter tube forming the passage through the marine riser section. In particular, when the small-diameter buoyancy tubes are made of reinforced resinous material (such as an epoxy resin reinforced with glass-fibers), a favorable $Q^3/E$ ratio is obtained if:

$P_c$ = collapse pressure of a tube;
$E$ = elasticity modul;
$s$ = wall thickness of the tube;
$\bar{r}$ = average radius of the wall of the tube;
$r$ = outer radius of the wall of the tube;
$Q$ = density of the wall of the tube;
$Q^1$ = density of the air filled tube,
then the following formulae hold:

$$P_c = 0.27 \, E \, (s/\bar{r})^3 \qquad (1)$$

and $$Q^1 = \frac{2 \, m \, \bar{r} \, s \, Q}{m \, r^2} \approx \frac{2 \, s \, Q}{r} \qquad (2)$$

From (1) and (2) follows:

$$Q^1 = \sqrt[3]{\frac{8}{0.27} \frac{Q^3}{E} P_c}$$

which shows that for a certain desired collapse pressure, those tubes with a relatively small $Q^3/E$ ratio have the lowest density.

The invention is not limited to the use of metal large-diameter tubes in the marine riser sections. Instead of metal, other materials such as resinous material may be applied. In the same manner as described with reference to the small-diameter tubular means, the resinous material may be reinforced by suitable reinforcement material, such as glass-fibers.

The envelopes used for housing the small-diameter buoyancy tubes may be made of any material suitable for the purpose. As an example, reinforced resinous material is mentioned.

When applying semi-cylindrical envelopes as described with reference to FIGS. 5 and 6, any coupling or connecting means suitable for the purpose may be applied for interconnecting the envelopes and for connecting these envelopes to the large-diameter tube in a manner such that the buoyancy forces of the small-diameter tubes are transferred to the large-diameter tube when in a vertical position. Any type of coupling used for interconnecting the large-diameter tube to form a marine riser may be applied. These couplings, such as quick-acting couplings, are known per se and do not need further description.

A typical length of a riser section is about 30 feet. However, the invention may be applied to riser sections of any length. Although the buoyancy means extend along nearly the total length of each riser section in the examples described hereinabove, the invention also covers the use of buoyancy means which extend over only part of the length of the riser sections. Further when applying envelopes (each envelope enclosing a number of tubes) for holding the buoyancy tubes together, a plurality of envelopes may be used along the length of the riser section, rather than only one as shown in FIG. 5 of the drawing.

It will be appreciated that the small-diameter buoyancy tubes are filled with a fluid having a relatively low density with respect to water. Thus, the buoyancy means may be filled with gas (such as air) under low pressure (such as near vacuum). If desired, the gas may be at atmospheric pressure or a pressure higher than atmospheric. If necessary, a resinous foam may be introduced in the interior of the buoyancy means, which foam on hardening will increase the collapse strength of the buoyancy means.

The marine riser sections forming part of a marine riser are not necessarily of the same design. They may differ in the design of the buoyancy means. Also, the buoyancy tubes may be of the same design, but vary in wall thickness or diameter thereof. Thus, the tubes of the buoyancy means may have relatively small wall thickness when arranged in the upper part of a marine riser, and a relatively large wall thickness when arranged in the lower part of a marine riser.

The invention is not restricted to the size of the large-diameter tube and the sizes of the small-diameter tubes that have been referred to hereinbefore and shown in the drawings. These sizes have been mentioned and shown by way of example only. Any size of the tube forming the passage through the marine riser section may be applied provided that the passage is sufficiently wide to pass therethrough equipment for drilling or completion of submerged walls, or to pass therethrough a flow of fluid produced from the well.

The diameter of the buoyancy tubes does not essentially exceed the diameter of the tube forming the passage through the marine riser section. The size of the diameter or the diameters of the buoyancy tubes is chosen such that a dense packing is obtained. This reduces the outer diameter of the marine riser section and is of advantage when storing the marine riser sections (or when storing the buoyancy means separately from the large diameter tubes) and when passing the marine riser section through openings in the drilling vessel to lower the marine riser into a submerged well.

The walls of the buoyancy tubes may be made of any resinous material in combination with any type of reinforcement. Apart from glass-fibers as mentioned already above, fibers of other composition (for example, carbon) may be used. If necessary, the density of the wall can be reduced by incorporating hollow gas-filled spheres therein. The walls of such spheres may be made of resinous material. The spheres may be embedded in non-reinforced resin, whereas the inner and outer layers of the walls of the tubes may consist of reinforced resin. The amount of fibers in the inner wall layer may be greater than the amount of fibers incorporated in the outer wall layer.

We claim as our invention:

1. Offshore apparatus for carrying out operations in a submerged well, said apparatus comprising underwater well equipment, a floating platform and a marine riser, said riser extending upwards from the well equipment in the direction of the platform and consisting of sections interconnected by coupling means, buoyancy-transmitting means secured to the outer surface of a plurality of said riser sections between and displaced from said coupling means thereof, each riser section provided with buoyancy-transmitting means comprising a large-diameter open-ended tube and small-diameter stiff-walled fluid-tight buoyancy tubes of circular cross-section arranged around the outer wall of the large-diameter tube and against the buoyancy-transmitting means in a manner such that the outer wall parts of the buoyancy tubes are exposed to and loaded by a pressure substantially equal to the hydrostatic pressure at the level of these parts, and the buoyancy force of the buoyancy tubes is transmitted to the large-diameter tube through said buoyancy-transmitting means.

2. Offshore apparatus according to claim 1, wherein the outer walls of the buoyancy tubes are in contact with the water.

3. Offshore apparatus according to claim 1, wherein the space between the outer walls of the buoyancy tubes as well as the space between the outer walls of these tubes and the outer wall of the large-diameter tube comprises a composition adhering at least to the outer walls of the small-diameter tubes and adapted for transmitting hydraulic pressure.

4. Offshore apparatus according to claim 1, including at least one envelope arranged along the large-diameter tube between the coupling means thereof for housing said buoyancy tubes, the ends of the envelopes of adjacent sections of the marine riser being in spaced relationship with each other.

5. Offshore apparatus according to claim 4, wherein the envelope is perforated.

6. Offshore apparatus according to claim 4, wherein the envelope is designed to transmit hydraulic pressure from the exterior to the interior thereof and the space left outside the buoyancy tubes is filled with a composition adapted for transmitting hydraulic pressure.

7. Marine riser section comprising a large-diameter open-ended tube with coupling means at both ends thereof for connecting the tube to similar tubes to form a marine riser adapted for being coupled to underwater well equipment, buoyancy-transmitting means secured to the outer surface of said tube between and displaced from said coupling means thereof, and further comprising small-diameter stiff-walled fluid-tight buoyancy tubes of circular cross-section arranged around the large-diameter tube and bearing against said buoyancy-transmitting means in a manner such that buoyancy forces exerted by the buoyancy tubes in a direction along the large-diameter tube are transmitted to this latter tube, said buoyancy tubes being exposed to the fluid pressure outside said tube.

8. Marine riser section according to claim 7, wherein the space between the outer walls of the buoyancy tubes as well as the space between the outer walls of these tubes and the outer wall of the large-diameter tube is filled with a composition adhering at least to the outer walls of the small-diameter tubes and adapted for transmitting hydraulic pressure.

9. Marine riser section according to claim 7, including at least one pressure-transmitting envelope arranged along the large diameter tubing between the coupling means thereof for housing said buoyancy tubes, the envelopes terminating short of said coupling means.

10. Marine riser section according to claim 9, wherein the envelope is perforated.

11. Marine riser section according to claim 9, wherein the space left outside the buoyancy tubes within the envelope is filled with a composition adapted for the transmission of hydraulic pressure.

12. Marine riser section according to claim 11, wherein the composition is a liquid.

13. Marine riser section according to claim 11, wherein the composition is of grease-like consistency.

14. Marine riser section according to claim 11, wherein the density of composition is less than 1.

15. Buoyancy means for a marine riser section having a central opening extending the length thereof for receiving a pipe section longer than said buoyancy means, said buoyancy means comprising a number of stiff-walled fluid-tight tubes of circular cross-section, the tubes being adapted to be assembled on a pipe section by means of a composition adhering to the outer walls of the buoyancy means and adapted for transmitting hydraulic pressure.

* * * * *